US012044202B2

(12) United States Patent
Rautmann et al.

(10) Patent No.: US 12,044,202 B2
(45) Date of Patent: Jul. 23, 2024

(54) WIND TURBINE ROTOR BLADE AND AERODYNAMIC ADD-ON ELEMENT

(71) Applicant: Nordex Energy SE & Co. KG, Hamburg (DE)

(72) Inventors: Christof Rautmann, Norderstedt (DE); Felix Warzok, Meissen (DE); Thomas Lipka, Rostock (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 18/047,165

(22) Filed: Oct. 17, 2022

(65) Prior Publication Data

US 2023/0125246 A1 Apr. 27, 2023

(30) Foreign Application Priority Data

Oct. 21, 2021 (EP) ..................................... 21203856

(51) Int. Cl.
*F03D 1/06* (2006.01)
(52) U.S. Cl.
CPC ...... *F03D 1/0633* (2013.01); *F05B 2240/305* (2020.08)
(58) Field of Classification Search
CPC .......................... F03D 1/0633; F05B 2240/305
See application file for complete search history.

(56) References Cited

U.S. PATENT DOCUMENTS 10,697,426 B2 * 6/2020 Hurault ................. F03D 1/0675

FOREIGN PATENT DOCUMENTS

| EP | 2 027 390 B1 | 2/2009 |
| EP | 2 597 300 A1 | 5/2013 |
| EP | 3 168 458 A1 | 5/2017 |
| EP | 3 177 827 B1 | 6/2017 |
| EP | 3 279 467 A1 | 2/2018 |
| EP | 3 510 276 B1 | 7/2019 |
| EP | 3 514 370 A1 | 7/2019 |
| EP | 3 620 648 A1 | 3/2020 |

(Continued)

OTHER PUBLICATIONS

Extended European Search Report of the European Patent Office dated Apr. 13, 2022 for European application 21203856.6 on which this application is based.

(Continued)

*Primary Examiner* — Sabbir Hasan
(74) *Attorney, Agent, or Firm* — Walter Ottesen, P.A.

(57) ABSTRACT

The disclosure relates to a wind turbine rotor blade, including an aerodynamic add-on element comprising a baseplate, the baseplate having an upper side and a bottom side, wherein the aerodynamic add-on element is mounted with the bottom side of the baseplate to an outer surface of the wind turbine rotor blade, at least a section of the bottom side is inclined relative to the outer surface of the wind turbine rotor blade along a downstream direction of an operational wind flow, such that a gap is formed between the at least one section and the outer surface in which a distance between the outer surface and the bottom side increases along the downstream direction, and adhesive is provided in the gap to bond the aerodynamic add-on element to the outer surface of the wind turbine rotor blade. The disclosure also relates to an aerodynamic add-on element.

17 Claims, 8 Drawing Sheets

(56) References Cited

FOREIGN PATENT DOCUMENTS

| WO | 2017/088881 A1 | 6/2017 |
| WO | 2019/197474 A1 | 10/2019 |
| WO | 2020182762 A1 | 9/2020 |

OTHER PUBLICATIONS

Office Action of the European Patent Office dated Mar. 15, 2024 for European application 21203856.6 on which this application is based.

* cited by examiner

WIND TURBINE ROTOR BLADE AND AERODYNAMIC ADD-ON ELEMENT

CROSS REFERENCE TO RELATED APPLICATION

This application claims priority of European patent application no. 21203856.6, filed Oct. 21, 2021, the entire content of which is incorporated herein by reference.

TECHNICAL FIELD

The present disclosure relates to a wind turbine rotor blade having an aerodynamic add-on element. The disclosure also relates to an aerodynamic add-on element for mounting to a wind turbine rotor blade.

BACKGROUND

It is known to provide a variety of aerodynamic add-on elements on the outer surface of wind turbine rotor blades in order to improve the performance of the rotor blade or, for example, to reduce noise levels produced by the rotor blades in use. Typical aerodynamic add-on elements include flaps such as Gurney flaps, vortex generators, and other trailing edge devices such as serrations. The aerodynamic add-on elements may be mounted to the outer surface of the blade shell. These aerodynamic add-on elements are often generally referred to as 'add-ons', and may be provided on the rotor blade during the rotor blade manufacturing process, or later to existing rotor blades as a retrofit.

Specifically, vortex generators are used to generate vortices on the rotor blade surface. These vortices transport high energetic (fast) airflow from outside the aerodynamic boundary layer closer to the rotor blade surface. Thus, the flow energized is more able to follow the airfoil contour against the adverse pressure gradient. A flow separation is avoided. Thus, the overall aerodynamic performance of the rotor blade at high angles of attack can be efficiently increased.

Vortex generators are typically attached to the rotor blade surface by either double sided tape or adhesive/glue. In both cases a defined bond line (or tape) thickness is required to fulfil structural needs.

SUMMARY

It is an object of the disclosure to specify a concept for an aerodynamic add-on element of a wind turbine rotor blade which contributes to a particularly flow-optimized assembly.

According to an aspect of the disclosure a wind turbine rotor blade is disclosed. The wind turbine rotor blade includes an aerodynamic add-on element comprising a baseplate. The baseplate has an upper side and a bottom side. The aerodynamic add-on element is mounted with the bottom side of the baseplate to an outer surface of the wind turbine rotor blade. At least a section of the bottom side is inclined relative to the outer surface of the wind turbine rotor blade along a downstream direction of an operational wind flow, such that a gap is formed between the at least one section and the outer surface in which a distance between the outer surface and the bottom side increases along the downstream direction. Adhesive is provided in the gap to bond the aerodynamic add-on element to the outer surface of the wind turbine rotor blade.

From an aerodynamic point of view the thickness of the adhesive, that is, a bond line, is very critical, as it introduces a step and a certain distance of the baseplate from the outer surface of the rotor blade. If this step becomes too high, there will be a negative impact on the local air flow and the aerodynamic properties of the rotor blade. Disturbances of the flow cause additional drag and make the flow more prone to flow separation. Thus, the overall performance of the wind turbine rotor blade decreases.

The above mentioned aerodynamic requirements are contrary to structural configuration requirements. The main loading of the bond line arises from strains in the rotor blade shells in longitudinal direction, which, due to the comparatively low stiffness of adhesive materials, is not transferred into the add-ons. Hence, the adhesive must compensate these differences, which introduces shear loads in the bond line. The loading level can be assumed linearly proportional to bond line thickness wherein a thicker bond line leads to smaller shear loading.

To mitigate the aerodynamically unfavorable step while keeping a structurally required adhesive thickness, at least a section of the baseplate, in particular its underside or bottom side, is inclined or tilted with respect to the outer surface of the wind turbine rotor blade. Thus, a gap is formed between the bottom side and the outer surface, which gap increases along the downstream direction. In other words, height of the gap or thickness of the respective adhesive in the gap increases. This allows a tilted add-on element with a very small step at the up-wind side, in particular the up-wind edge and a larger, aerodynamically much more tolerable step at the down-wind side, in particular the down-wind edge. Simultaneously, a sufficient bond-line thickness due to the increasing gap height is obtained. Optionally, the step at the down-wind edge of the add-on element could be thicker than structurally necessary. This configuration fulfills structural need and is aerodynamically much more favorable than a larger or wider gap over the full length.

The gap beneath the add-on may either be completely filled with adhesive or, alternatively, spacers or barriers can be introduced. This would reduce adhesive material if the spacers are not filled, would allow the adhesive to start with a structurally sufficient thickness in the supposedly downwind section or may act as crack stoppers to prevent cracks in the adhesive to run from one section into the other one if adhesives are applied to both. For a gap with a small height, this may be a non-structural adhesive, for example to prevent water ingress. We refer to the further details and embodiments below.

The proposed solution enables both structural and aerodynamic requirements as an inclined bottom side (and thus an increasing gap height/adhesive thickness in down-wind direction) is combined with a sufficiently thick bond line. The disclosure provides further advantages:

- The aerodynamic performance of the add-on element and thus of the whole wind turbine can be increased due to the better working add-on elements with less drag and less air flow disturbance (compared to overall thick bond line).
- A cost of energy reduction can be achieved. In particular, a cost of energy optimum can be achieved.
- Standard adhesives can be used.
- Reduced effort in rotor blade finish is possible since adhesive enables larger tolerance against surface waviness.
- A defined bond line thickness can be guaranteed. This increases production quality and reduces the risk of expensive service jobs.
- Structural as well as aerodynamic needs can be fulfilled in one configuration.

The term "gap" can also be interpreted as a space, which is defined by the outer surface of the blade and the bottom side. This space can be filled with adhesive. Due to the mentioned configuration, gap height and thus adhesive thickness increases. Different geometries can be applied to the gap and thus the adhesive in the gap, for example a triangular shape (profile) or trapezoidal shape (profile).

As already indicated above, the "aerodynamic add-on element" means an element which is attached to the rotor blade, in particular to the outer surface of the shell, and has aerodynamic impacts on the rotor blade. The aerodynamic add-on element is mounted on the rotor blade in a mounting region, which comprises the outer surface. The aerodynamic add-on element may be any blade add-on, for example it may be a flap or a turbulence generating device such as a vortex generator. Such devices typically include a baseplate having an inner surface or bottom plate for bonding to the rotor blade surface. An outer surface of the baseplate may include one or more turbulence generating features such as the fins of vortex generators. Alternatively, a flap may extend from the baseplate. The device may be located either on the pressure side surface or the suction side surface of the rotor blade, at the leading edge or trailing edge of the blade, or at any other suitable position on the blade surface.

The baseplate may be made of any suitable material, but preferably it is made from a plastics material. In preferred embodiments, the baseplate is an injection-molded component. Aerodynamic features of the device, such as serrations or turbulence-generating features may advantageously be integrally-formed with the baseplate. This reduces the number of parts and reduces cost, and increases the structural integrity and ease of mounting of the device.

The baseplate may have any suitable shape, for example rectangular or substantially rectangular or substantially trapezoidal. The baseplate is preferably relatively thin, typically of the order of a few millimeters in thickness. The baseplate is also preferably substantially planar. The baseplate may therefore have some flexibility allowing it to conform to contours of the outer surface of the rotor blade. The mounting region of the baseplate preferably occupies a substantial portion (for example, a majority) of the inner surface of the baseplate. Maximizing the area of the mounting region is advantageous since it maximizes the bond area between the baseplate and the surface of the rotor blade. The mounting region may have any suitable shape, but preferably corresponds substantially in shape to the baseplate (for example, substantially rectangular or trapezoidal) and is located inwardly of an outer perimeter of the baseplate.

According to an embodiment, the aerodynamic add-on element is a vortex generator.

According to an embodiment the baseplate is tilted relative to the outer surface of the wind turbine rotor blade. That means that the upper side respectively outer surface is inclined or tilted with respect to the outer surface of the wind turbine rotor blade as well. This contributes to the above advantages and effects.

According to an embodiment a height of the gap increases along the downstream direction. The gap/space is such that the adhesive thickness (or gap height) increases over length in downstream direction. The thickness increases continuously or gradually. Alternatively, the thickness increases stepwise. Also, combinations thereof are possible, for example, different sections with stepwise or continuously increasing thickness. This contributes to the above advantages and effects.

According to an embodiment a height of the gap increases from 0.1 mm, preferably 0.2 mm, to 1 mm, preferably 0.7 mm, 0.6 mm or more preferably 0.5 mm. This particularly contributes to the above advantages and effects.

According to an embodiment the wind turbine rotor blade comprises a gradual transition between the outer surface of the wind turbine rotor blade and the aerodynamic add-on element at the up-wind side. This contributes to the above advantages and effects.

According to an embodiment the distance between an upper side of the aerodynamic add-on element and the surface of the wind turbine rotor blade at the up-wind side is smaller than at the down-wind side of the aerodynamic add-on element. Thus, the aerodynamic add-on element comprises none or only a small step at the up-wind side of the aerodynamic add-on element. This contributes to the above advantages and effects.

According to an embodiment a structural relevant thickness of the adhesive in the gap to bond the add-on element to the blade, for example, 0.5 mm, is reached at a certain distance from the up-wind side of the adhesive in the gap with regard to the downstream direction. This contributes to the above advantages and effects.

According to an embodiment at least one section of the bottom side comprises one or more spacers, the spacers being in direct contact with the outer surface of the wind turbine blade. The spacers define the distance between the inner surface of at least one add-on section and the outer surface of the rotor blade. In other words, the spacers guarantee a correct position and orientation, for example, tilting, of the aerodynamic add-on element on the outer surface. Further, the spacers guarantee a defined amount of adhesive in the gap.

According to an embodiment the spacers are formed as line shaped spacers, cylindrical spacers or point spacers. Thus, different kinds of spacers are provided. For example, an area support, a line support, a point support or combinations thereof are possible, which can be selected depending on the configuration of the add-on element and/or blade, for example.

According to an embodiment at least one section of the bottom side comprises a web running transverse to the operational wind flow, the web being in direct contact with the outer surface of the wind turbine rotor blade, wherein the web separates the gap into a first gap section and a second gap section, such that the adhesive is divided into a first and a second gap section. The web essentially has two functions. Basically, it acts as a line-spacer. Additionally, it serves as a crack stopper, if the adhesive get cracks. By providing a separation of the gap into at least two gap sections, the applied adhesive is divided into corresponding sections. In other words, the adhesive in the first gap section has no contact with the adhesive in the second gap section. Thus, a potential crack cannot run through the whole adhesive from the up-wind side to the down-wind side, since it cannot surpass the web. This provides a particularly reliable and robust fixation of the add-on element on the rotor blade.

According to an embodiment a further section of the add-on element bottom side is directly arranged on the wind turbine rotor blade outer surface. In this "close contact" section no adhesive is provided between the baseplate and the outer surface of the rotor blade. Therefore, the baseplate and thus the add-on element are attached particularly close to the outer surface, thereby improving the aerodynamic effects of the add-on element and reducing adhesive material use.

According to an embodiment the further section of the bottom side is arranged upstream of at least one section of the bottom side. In particular, the further section is a front section of the bottom side. This is related to the downstream direction of operational wind flow. This contributes to the above advantages and effects, in particular a small or no step can be provided at the up-wind side.

According to an embodiment the further section comprises spacers or is formed as a spacer section. For example, the further section comprises spacers formed as ribs. Reference is made to the above functions and advantages.

According to a further aspect, an aerodynamic add-on element for mounting to an outer surface of a wind turbine rotor blade, in particular according to an embodiment mentioned above, is disclosed. The add-on element comprises a baseplate which has an upper side and a bottom side. The aerodynamic add-on element is configured to be mounted with the bottom side of the baseplate to an outer surface of the wind turbine rotor blade. The aerodynamic add-on element is configured such that—in a mounted state—at least a section of the bottom side is inclined relative to the outer surface of the wind turbine rotor blade along a downstream direction of an operational wind flow, such that a gap is formed between the at least one section and the outer surface in which a distance between the outer surface and the bottom side increases along the downstream direction, and such that adhesive can be provided in the gap to bond the aerodynamic add-on element to the outer surface of the wind turbine rotor blade.

The add-on element according to the further aspect enables the above mentioned effects, functions and advantages.

BRIEF DESCRIPTION OF THE DRAWINGS

The disclosure will now be described with reference to the drawings wherein.

DESCRIPTION OF THE PREFERRED EMBODIMENTS

Figure 1:
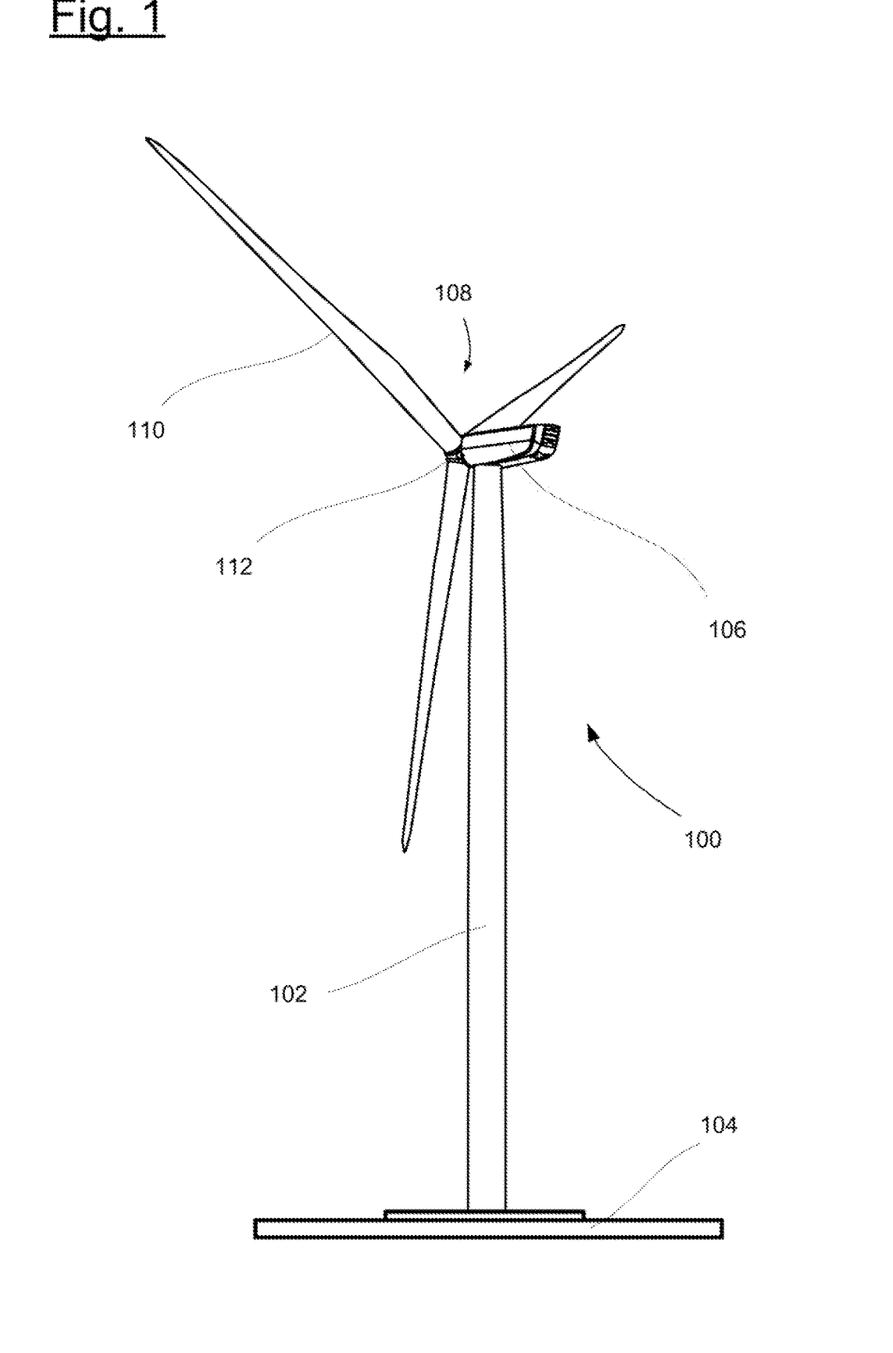
FIG. 1 shows a schematic view of a wind turbine.

FIG. 1 shows a schematic view of a wind turbine 100, which comprises a tower 102. The tower 102 is fixed to the ground via a foundation 104. At one end of the tower 102 opposite to the ground a nacelle 106 is rotatably mounted. The nacelle 106, for example, comprises a generator which is coupled to a rotor 108 via a rotor shaft (not shown). The rotor 108 comprises one or more (wind turbine) rotor blades 110, which are arranged on a rotor hub 112.

During operation, the rotor 108 is set in rotation by an air flow, for example wind. This rotational movement is transmitted to the generator via the rotor shaft and, if necessary, a gearbox. The generator converts the mechanical energy of the rotor 108 into electrical energy.

Figure 2:
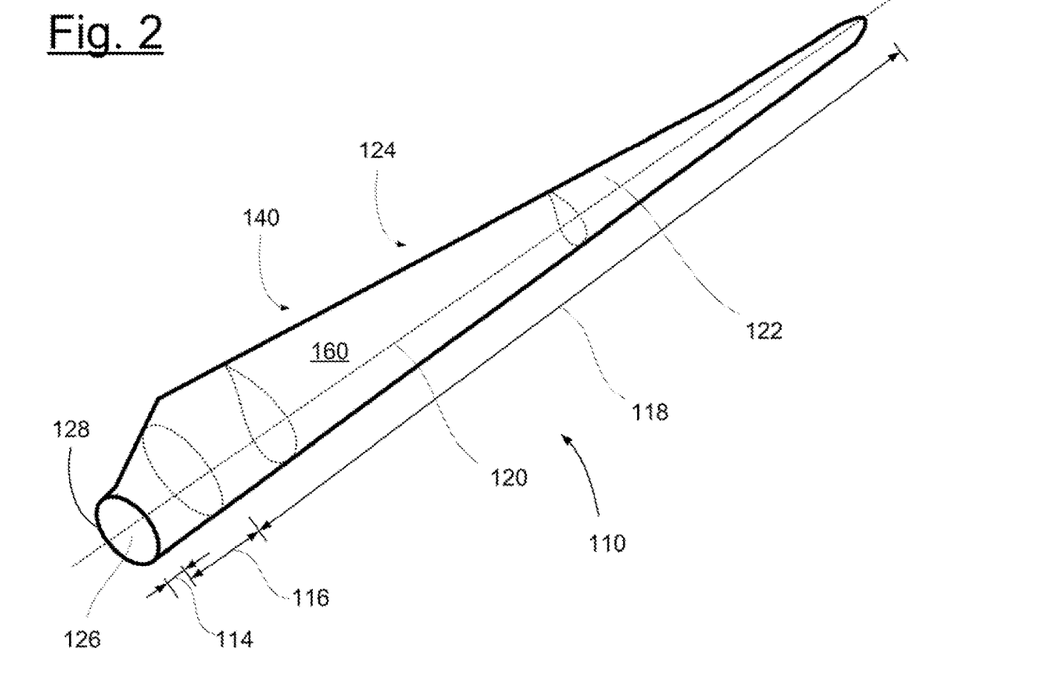
FIG. 2 shows a schematic view of a wind turbine rotor blade.

FIG. 2 shows a rotor blade 110. The rotor blade 110 has the shape of a conventional rotor blade and has a rotor blade root area 114 facing the rotor hub 112. The rotor blade root area 114 typically has an essentially circular cross-section. The rotor blade root area 114 is followed by a transition area 116 and a profile area 118 of the rotor blade 110. The rotor blade 110 has a pressure side 122 and an opposite suction side 124 with respect to a longitudinal extension direction 120 (also main extension direction). The rotor blade 110 is essentially hollow inside.

In the rotor blade root area 114 a rotor blade root end 126 with a flange connection 128 is provided, via which the rotor blade 110 can be mechanically connected to a pitch bearing or an extender.

Figure 3:
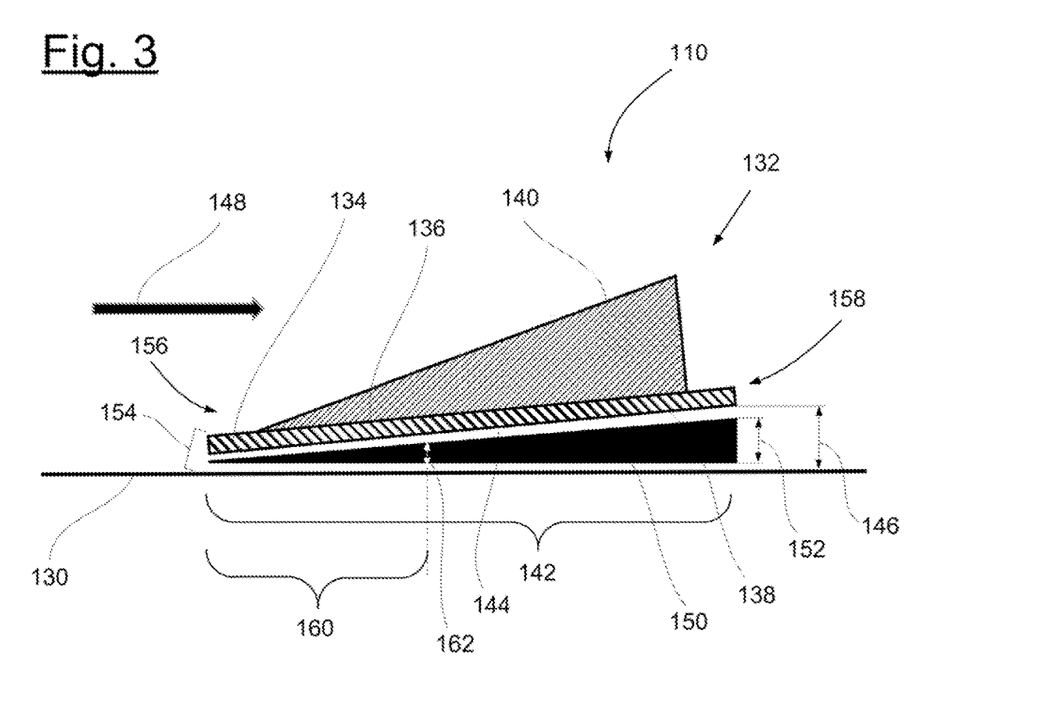
FIGS. 3 to 5 show schematic views of a wind turbine rotor blade with an aerodynamic add-on element according to embodiments of the disclosure; and, FIGS. 6 to 20 show aerodynamic add-on elements according to further embodiments of the disclosure in different views.

FIG. 3 shows a schematic view of a rotor blade 110 according to an embodiment of the disclosure. The rotor blade 110 comprises an outer surface 130. The rotor blade 110 comprises an aerodynamic add-on element 132 (short: add-on element), which is a vortex generator. The aerodynamic add-on element 132 has a baseplate 134, which has an upper side 136 and a bottom side 138 opposing the upper side 136. The upper side 136, which does not necessarily need to be flat, comprises one or more turbulence generating features 140 such as vortex generators. With the bottom side 138, the aerodynamic add-on element 132 is mounted to the outer surface 130 of the rotor blade 110 in a mounting region 142 thereof.

Particularly, the add-on element 132, in particular its baseplate 134, is tilted with regard to the outer surface 130. The bottom side 138 is inclined with respect to the outer surface 130 (in the schematic view the whole bottom side is inclined, but also only portions or sections of the bottom side 138 can be inclined), such that a gap 144 is formed between the bottom side 138 and the outer surface 130. A distance 146 between the bottom side 138 and the outer surface 130, that is, a gap height, increases continuously along a downstream direction 148 of an operational wind flow (wind flow during operation of wind turbine 100 with such rotor blade 110). The gap 144 is filled with adhesive 150, wherein an adhesive thickness 152 correspondingly increases continuously along the direction 148. The adhesive 150 firmly bonds the add-on element 132 to the rotor blade 110.

The rotor blade 110 as described above enables the above mentioned functions and advantages. In particular, only a small step 154 is provided at an up-wind side 156 (or up-wind edge) of the add-on element 132. In other words, a distance between the upper side 136 of the add-on element 132 and the outer surface 130 of the rotor blade 110 is smaller at the up-wind side 156 than at the down-wind side 158 (or down-wind edge) of the add-on element 132. For example, the height of the gap 146/adhesive thickness 152 increases from 0.2 mm to 0.7 mm.

A structural relevant thickness 162 of the adhesive 150 is reached at a certain distance 160 from the up-wind side 156. Such structural relevant thickness 162 is for example 0.5 mm.

In other embodiments a gradual transition between the outer surface 130 of the rotor blade 110 and the add-on element 132 at the up-wind side 156 is provided, that is, there is essentially no step 154.

According to the embodiment of FIG. 3, the adhesive 150 has a triangular shape. In other words, the gap 144 is triangularly formed.

Figure 4:
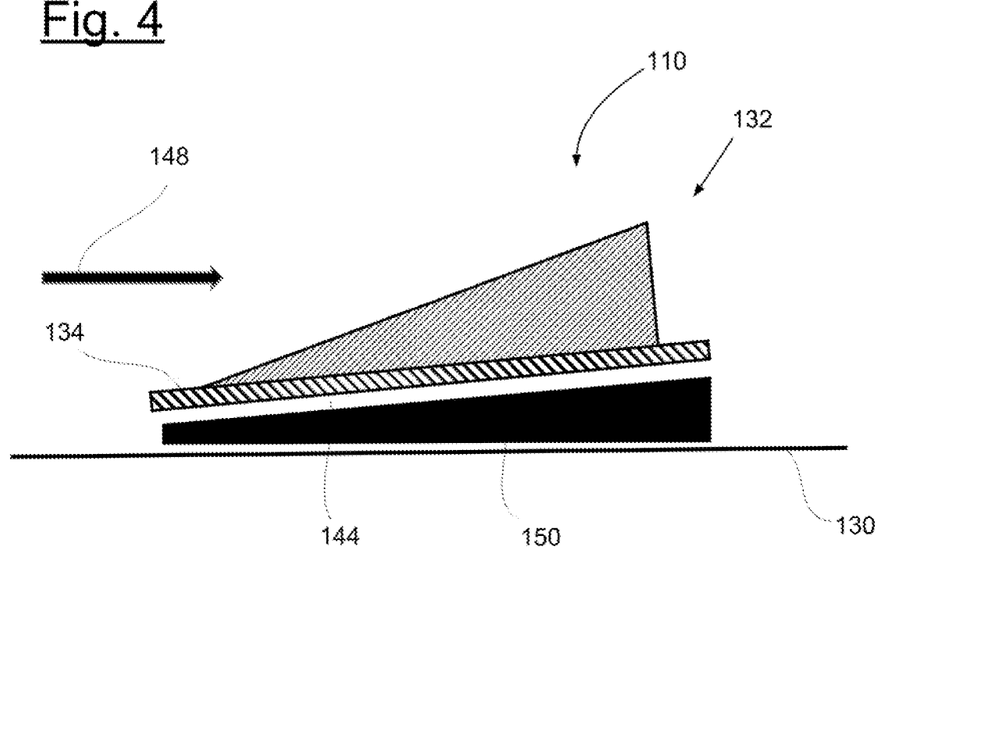
Figure 5:
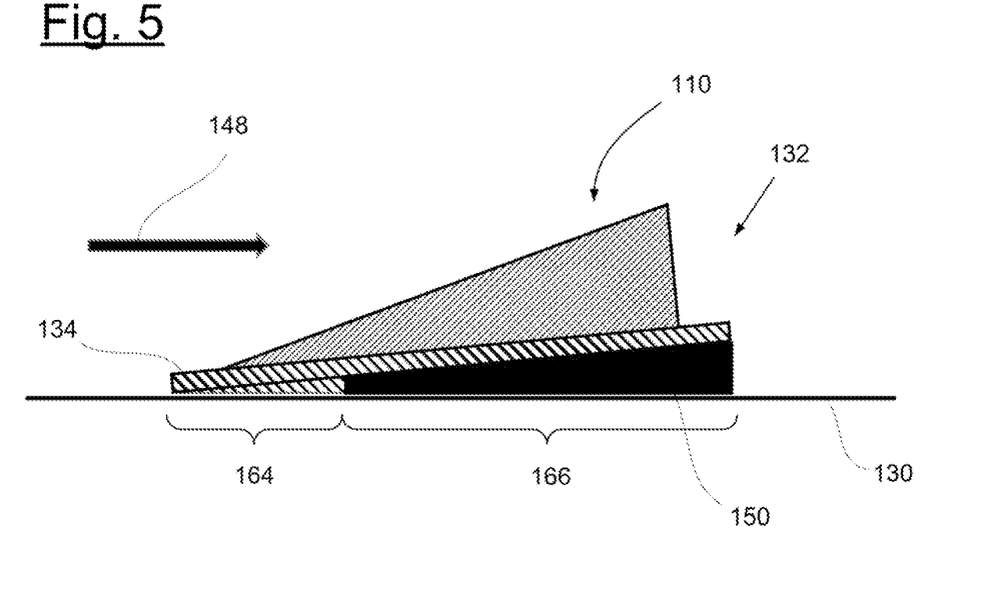

FIGS. 4 and 5 show rotor blades 110 according to further embodiments of the disclosure, which are similar to the embodiment shown in FIG. 3. Thus, we refer to the above description of features with regard to the reference signs (which are not repeatedly shown in FIG. 4).

According to FIG. 4, the only difference to the embodiment of FIG. 3 is the configuration of the gap 144 and thus the adhesive 150 applied therein, wherein a trapezoidal shape is provided.

According to FIG. 5, the baseplate 134 differs from the above embodiments in that the bottom side 138 (or baseplate 134) comprises a first section 164 and a second section 166 along the downstream direction 148. The first section 164 is inclined similar to the above described embodiments, such that the adhesive 150 has an increasing thickness 152 corresponding to the gap 144. The second section 166 is arranged upstream of the first section 164 and is in direct contact with the outer surface 130 of the rotor blade 110.

The bottom side 138 of the above embodiments, including the first and second sections 164, 166, may comprise spacers or the like, being in direct contact with the outer surface 130, which will be described in the following with regard to further embodiments shown in the FIGS. 6 to 20.

Figures 6, 7:
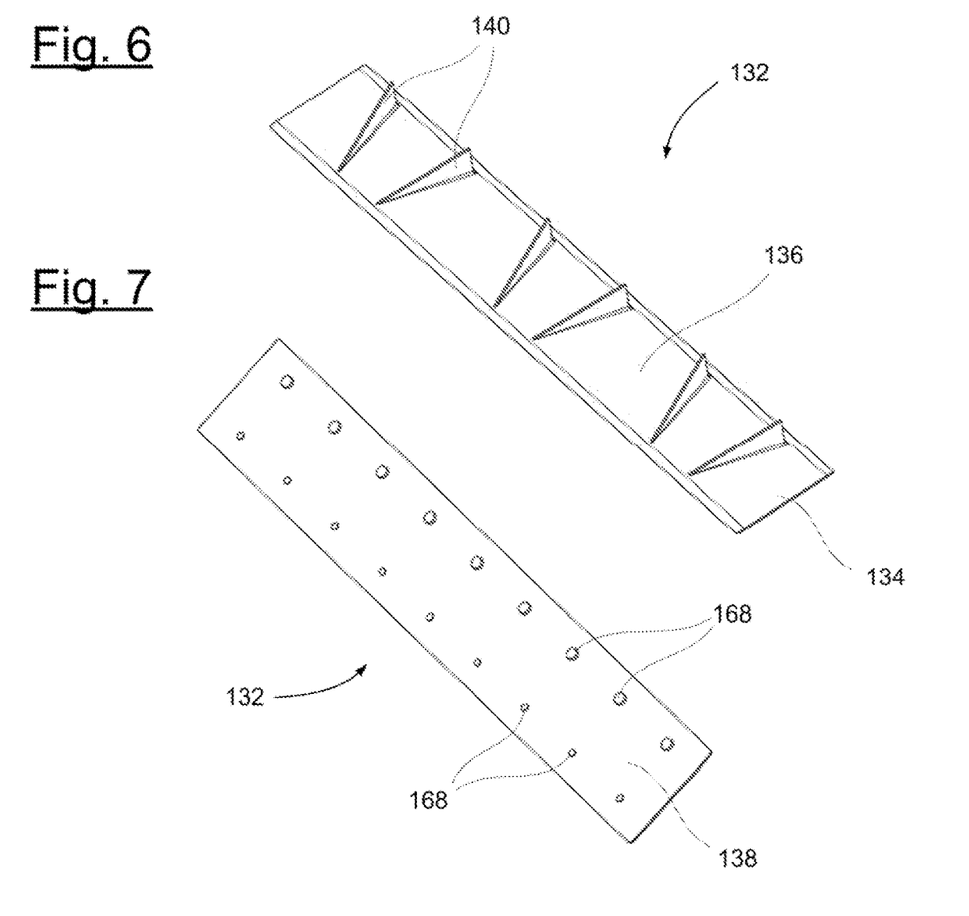
Figure 8:
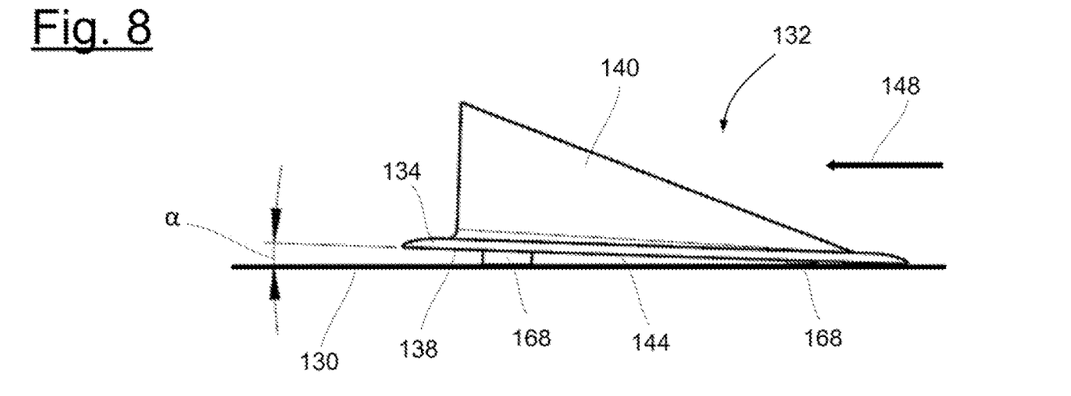

FIGS. 6 to 8 refer to an add-on element 132 according to an embodiment of the disclosure. FIG. 6 shows a perspective top view of the add-on element 132, FIG. 7 shows a perspective bottom view of the add-on element 132 and FIG. 8 shows a side view of the add-on element 132. The add-on element 132 comprises a baseplate 134 with an upper side 136 and a bottom side 138. On the upper side 136, several turbulence generating features 140 are provided.

To ensure the inclination of the bottom side 138 as described above, the bottom side 138 comprises spacers 168. As can be seen in FIG. 7, the spacers 168 are formed cylindrically. The spacers 168 are in direct contact with the outer surface 130 of the rotor blade 110 and comprise different sizes in order that the baseplate 134, in particular the bottom side 138, is inclined with respect to the outer surface 130 of the rotor blade 110. Similar to the above description, a suitable gap 144 is formed, in which the adhesive 150 can be provided. FIG. 8 shows a respective inclination angle α.

Figures 9, 10:
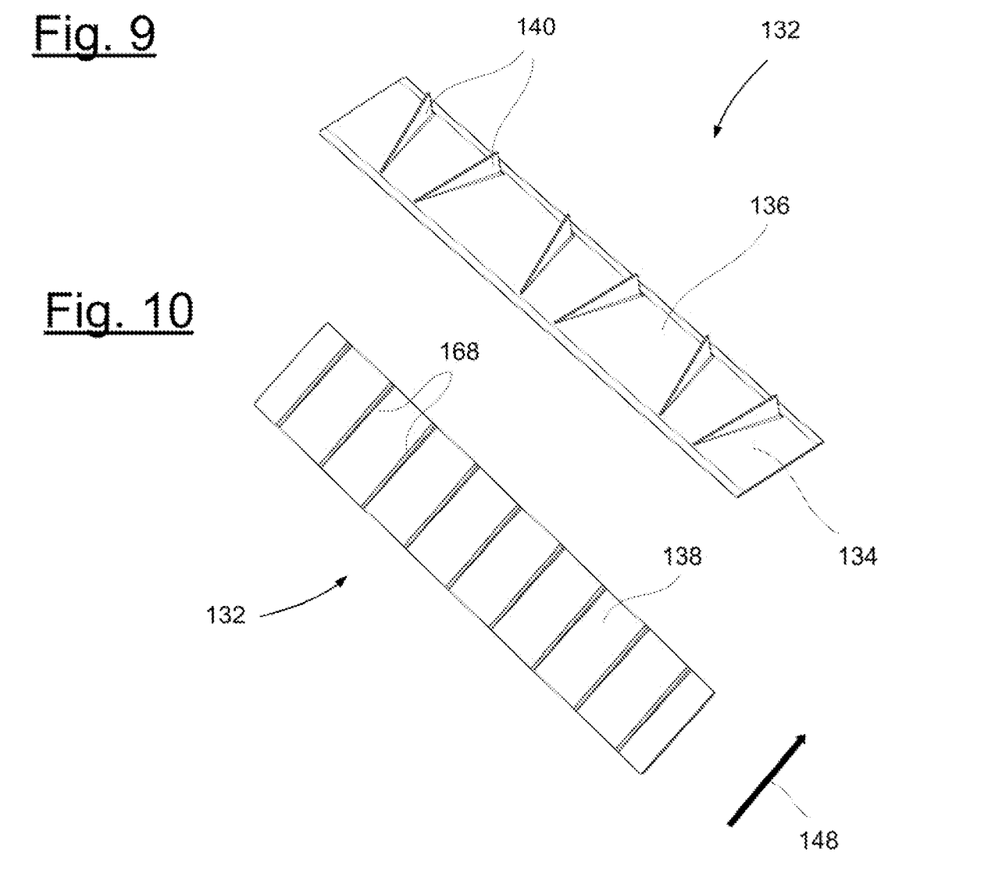
Figure 11:
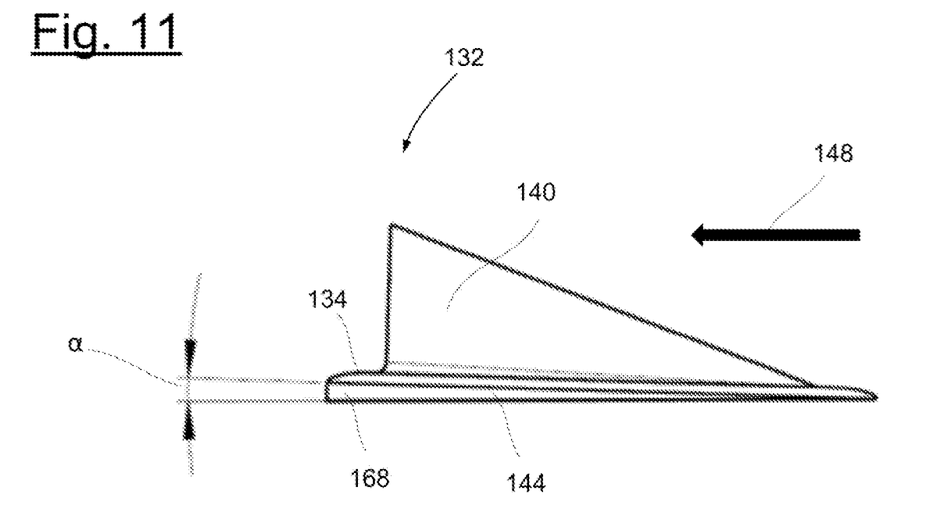

FIGS. 9 to 11 show a similar embodiment, with the only difference to the embodiment of FIGS. 6 to 8, that the spacers 168 are line-shape, running in the downstream direction 148. We refer to the above description of further details.

Figures 12, 13:
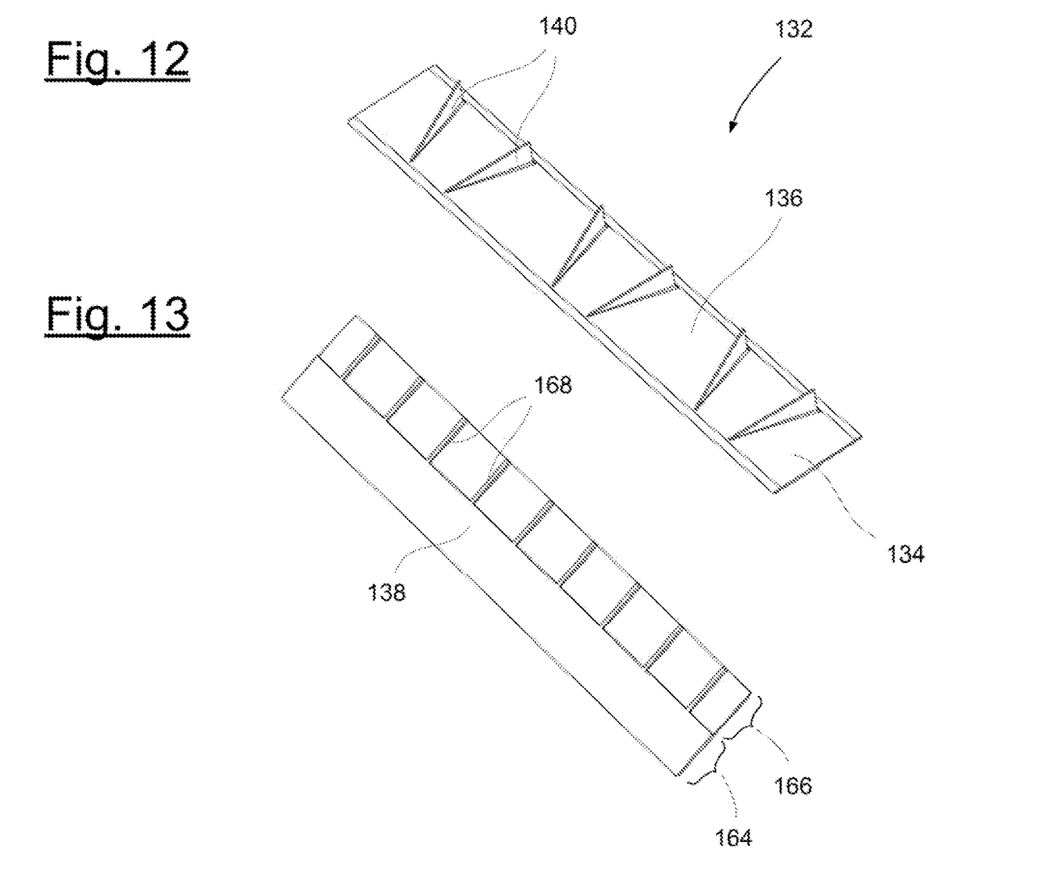
Figure 14:
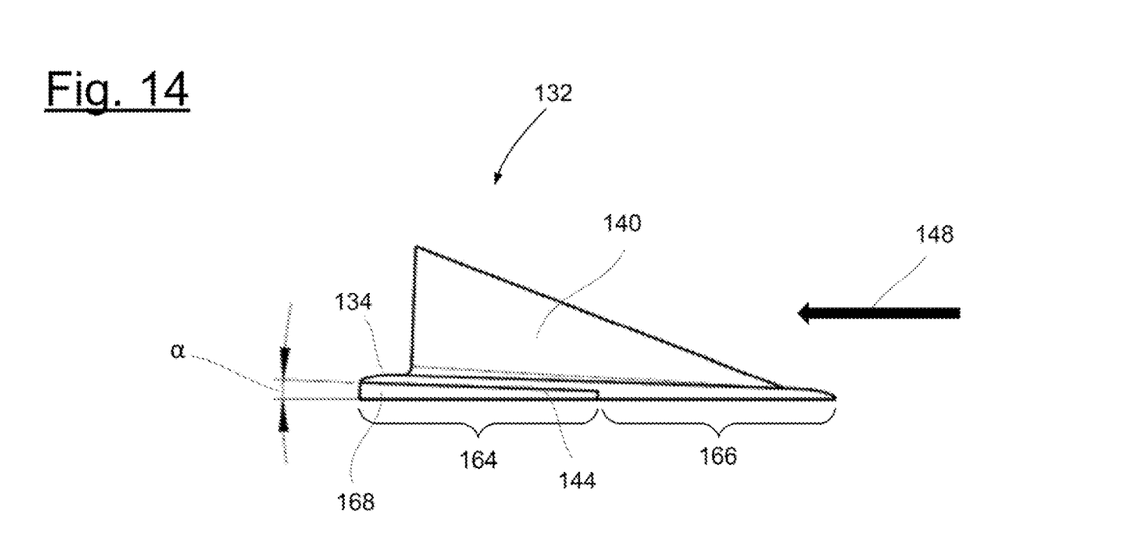

FIGS. 12 to 14 show a similar embodiment. The embodiment differs from the above embodiments according to FIGS. 6 to 11, in that the bottom side 138 comprises a first section 164 and a second section 166, for example, as described with regard to FIG. 5. In the first section, spacers 168 are provided, which are line-shaped and running in the downstream direction 148. The second section 166 is formed such that a direct contact to the outer surface 130 of the blade 110 is established. The second section 166 is made of full material and can also be seen as a front spacer region. This configuration allows the structural adhesive to exhibit a structurally sufficient thickness from the start and reduces the risk of crack initiation. We refer to the above description of further details.

Figures 15, 16:
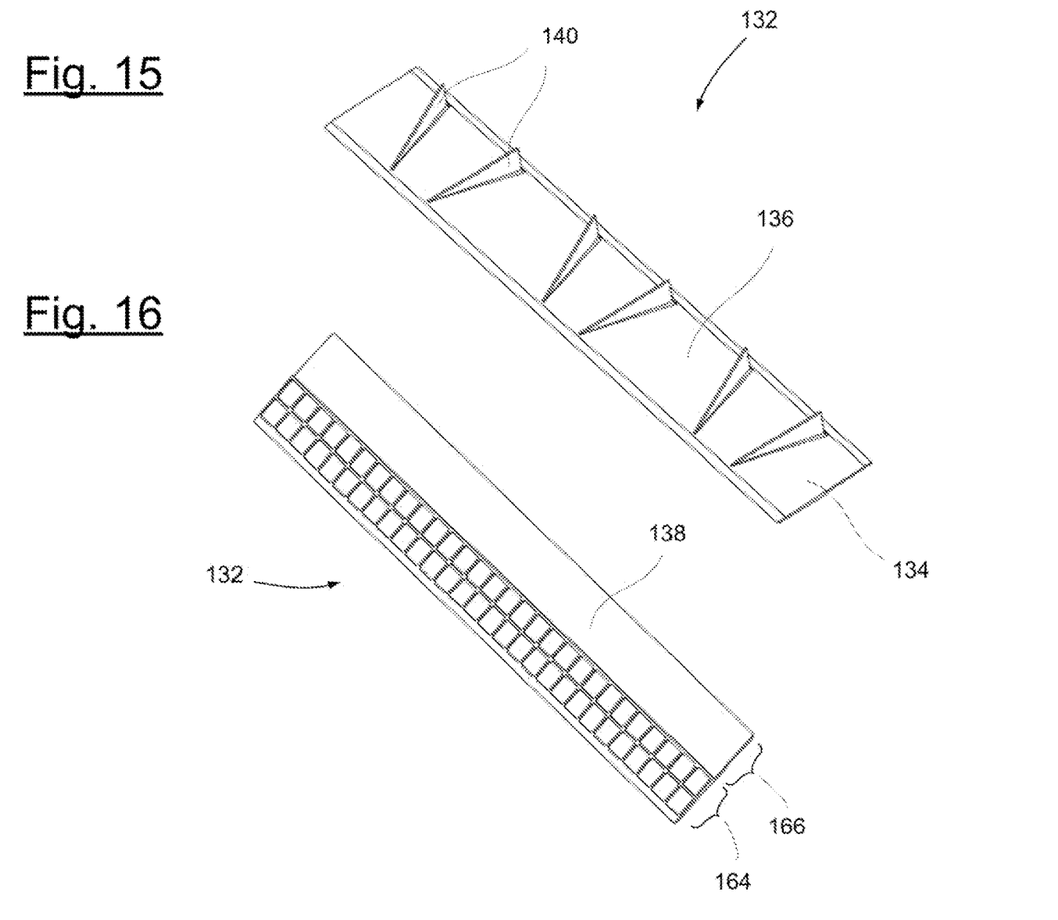
Figure 17:
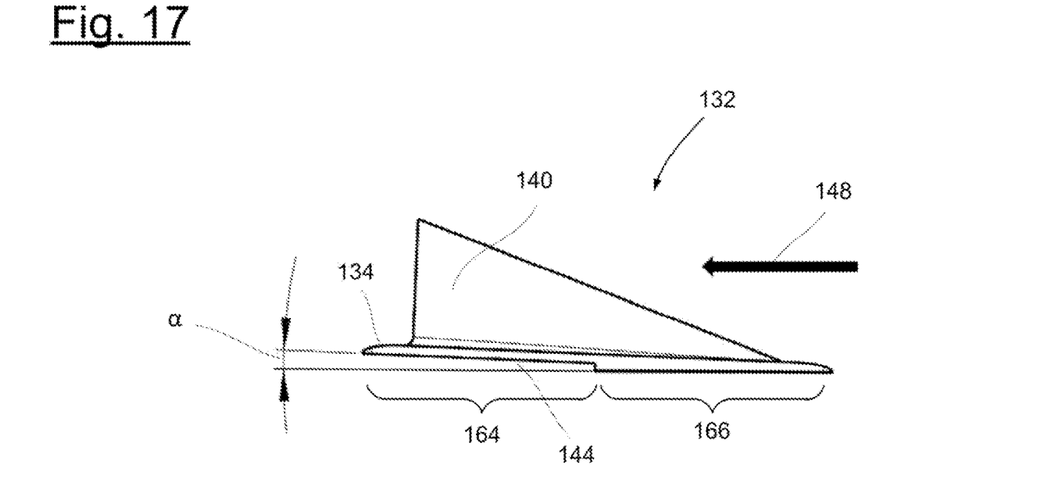

FIGS. 15 to 17 show another embodiment. Differing from the embodiment of the FIGS. 12 to 14, the second section 166 comprises spacers 168 formed as ribs, whereas the first section 164 does not comprise any spacers. The spacers 168 of the second section 166 (front section) serve for constant material thickness in the whole add-on element 132, which is important for high pressure injection molding.

Figures 18, 19:
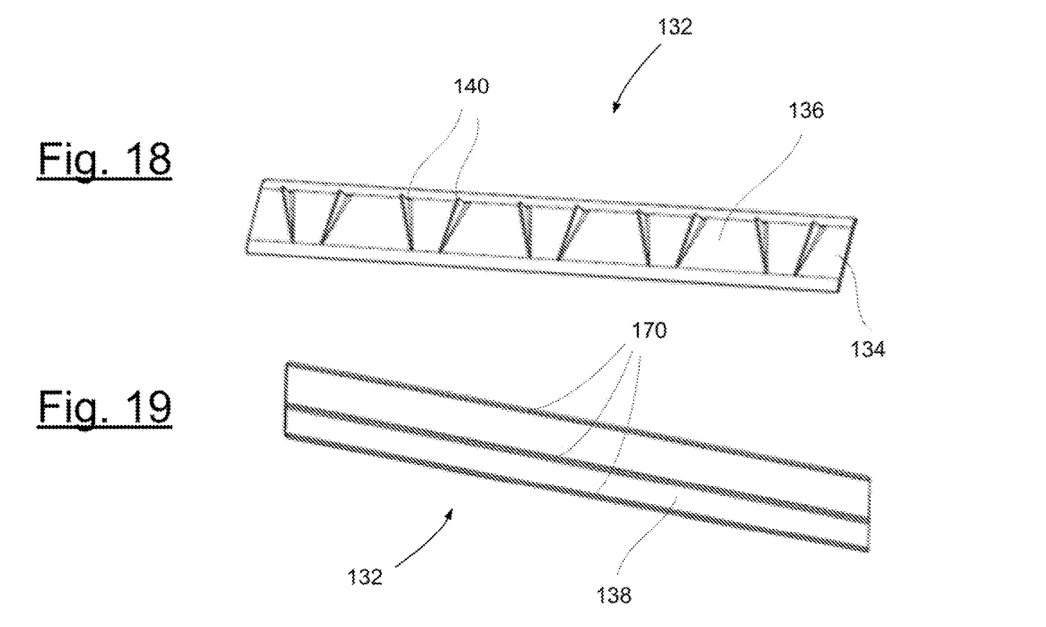
Figure 20:
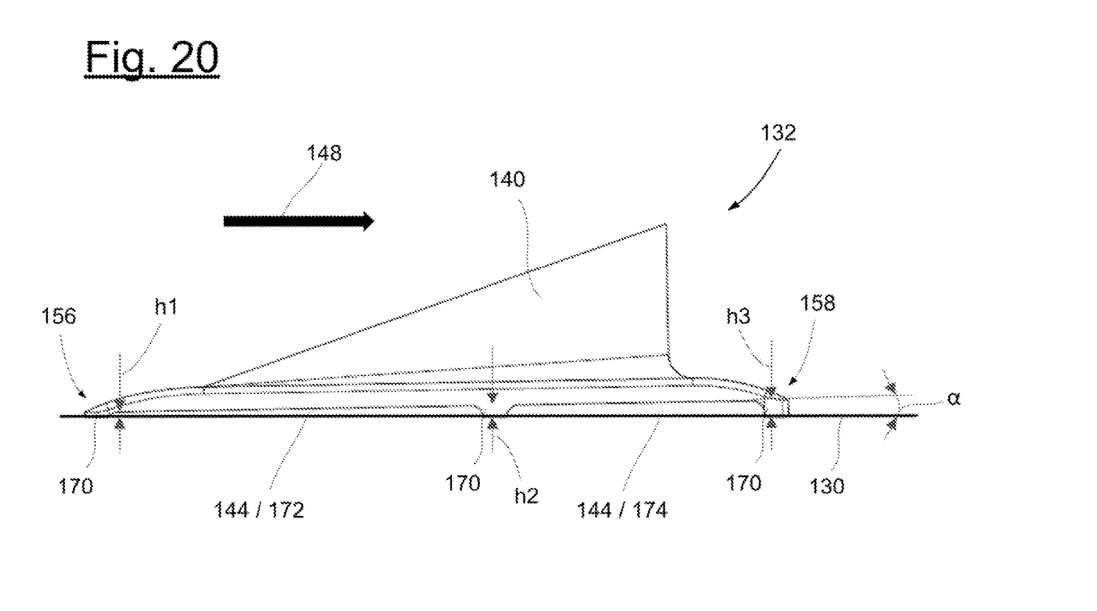

FIGS. 18 to 20 show a further embodiment, similar to the above embodiments. As a difference, at the bottom side 138, the baseplate 134 comprises webs 170, running transverse to the downstream direction 148. The webs 170 act as spacers functioning as described above. The spacers 168 are again in direct contact with the outer surface 130 of the blade 110 and define the gap 144 to be filled with adhesive for bonding the add-on element 132 to the blade 110. Along the downstream direction 148, in the present shown example, the gap 144 has a first height h1 of 0.2 mm at the up-wind side 156, a second height h2 of 0.5 mm in approximately the middle of the add-on element 132, and a third height h3 of 0.7 mm at the down-wind side 158. In the first gap section 172 a rather small gap for adhesive 150 to be applied is provided, in order to achieve good aerodynamic properties resulting from the wind flow in downstream direction. The first gap section 172 for example is not especially provided for structural means. The second gap section 174 is configured for structural bonding, wherein a sufficient height of the gap is provided for adhesive to be applied.

The middle web 170 of the three webs 170 separates the gap 144 into a first gap section 172 and a second gap section 174, such that adhesive 150, which is provided in the gap sections 172, 174, is divided into the first and second gap sections 172, 174, wherein the adhesive in the first gap section 172 has no contact with the adhesive in the second gap section 174. Thus, the middle web 170 serves as a crack stopper, as explained above.

Features of the different embodiments can be mixed, if necessary, for example, the embodiment according to the FIGS. 9 to 11 can additionally be provided with a rib in the middle of the bottom side 138 running transverse to the downstream direction 148.

It is understood that the foregoing description is that of the preferred embodiments of the invention and that various changes and modifications may be made thereto without departing from the spirit and scope of the invention as defined in the appended claims.

REFERENCE SIGNS 100 wind turbine
102 tower
104 foundation
106 nacelle
108 rotor
110 rotor blade
112 rotor hub
114 rotor blade root area
116 transition area
118 profile area
120 longitudinal extension direction
122 pressure side
124 suction side
126 rotor blade root end
128 flange connection
130 outer surface
132 aerodynamic add-on element
134 baseplate
136 upper side
138 bottom side
140 turbulence generating feature
142 mounting region
144 gap
146 distance
148 downstream direction
150 adhesive
152 adhesive thickness
154 step
156 up-wind side
158 down-wind side
160 distance
162 structural relevant thickness
164 first section
166 second section
168 spacers
170 web 172 first gap section
174 second gap section
h1 first height
h2 second height
h3 third height
α inclination angle

What is claimed is:

1. A wind turbine rotor blade comprising:
a rotor blade body having an outer surface;
an aerodynamic add-on element having a predetermined length in a downstream direction of an operational wind flow and including a planar baseplate having an upper side and a bottom side;
said aerodynamic add-on element being mounted with said bottom side of said baseplate facing said outer surface of said rotor blade body;
said planar baseplate being tilted on said outer surface of the rotor blade body so as to cause said bottom side to be inclined to said outer surface along said downstream direction of the operational wind flow, such that a gap is formed between said bottom side and said outer surface in which a distance between said outer surface and said bottom side increases along the downstream direction to impart a triangular shape to said gap; and,
an adhesive filling said gap of triangular shape to bond said aerodynamic add-on element to said outer surface of said rotor blade body along all of said predetermined length of said aerodynamic add-on element.

2. The wind turbine rotor blade of claim 1, wherein a height of said gap increases from 0.1 millimeter to 1 millimeter.

3. The wind turbine rotor blade of claim 1, wherein said outer surface and said aerodynamic add-on element define a gradual transition between said outer surface and said aerodynamic add-on element at an up-wind side.

4. The wind turbine rotor blade of claim 1, wherein a distance between said upper side of said aerodynamic add-on element and said rotor blade body at an up-wind side is smaller than at a downwind side of said aerodynamic add-on element.

5. The wind turbine rotor blade of claim 1, wherein a structural relevant thickness of said adhesive of 0.5 millimeter in said gap to bond said add-on element to said rotor blade body is reached at a certain distance from an up-wind side of said adhesive in said gap with regard to the downstream direction.

6. The wind turbine rotor blade of claim 1, wherein a height of said gap increases from 0.2 millimeter to 0.7 millimeter.

7. The wind turbine rotor blade of claim 1, wherein a height of said gap increases from 0.2 millimeter to 0.5 millimeter.

8. A wind turbine rotor blade comprising:
a rotor blade body having an outer surface;
an aerodynamic add-on element including a baseplate having an upper side and a bottom side;
said aerodynamic add-on element being mounted with said bottom side of said baseplate to said outer surface of said rotor blade body;
said bottom side having at least one section inclined relative to said outer surface of the rotor blade body along a downstream direction of an operational wind flow, such that a gap is formed between said at least one section and said outer surface in which a distance between said outer surface and said bottom side increases along the downstream direction;
an adhesive provided in said gap to bond said aerodynamic add-on element to said outer surface of said rotor blade body; and,
wherein said at least one section of said bottom side includes a web running transverse to an operational wind flow; said web is in direct contact with said outer surface of said rotor blade body; and, said web separates said gap into a first gap section and a second gap section such that said adhesive is divided into said first gap section and said second gap section.

9. The wind turbine rotor blade of claim 8, wherein said baseplate is tilted relative to said outer surface.

10. The wind turbine rotor blade of claim 8, wherein a height of said gap increases along the downstream direction.

11. The wind turbine rotor blade of claim 8, wherein said at least one section of said bottom side includes one or more spacers, said one or more spacers being in direct contact with said outer surface of the rotor blade body.

12. The wind turbine rotor blade of claim 11, wherein said one or more spacers are formed as line shaped spacers, cylindrical spacers or point spacers.

13. The wind turbine rotor blade of claim 8, wherein a further section of said bottom side of said add-on element is directly arranged on said outer surface of said rotor blade body.

14. The wind turbine rotor blade of claim 13, wherein said further section of said bottom side is arranged upstream of said at least one section of said bottom side.

15. The wind turbine rotor blade of claim 14, wherein said further section is a front section of said bottom side.

16. The wind turbine rotor blade of claim 13, wherein said further section includes spacers or is formed as a spacer section.

17. The wind turbine rotor blade of claim 13, wherein said further section includes spacers formed as ribs.

* * * * *